United States Patent [19]

Knapp et al.

[11] Patent Number: 4,676,270

[45] Date of Patent: Jun. 30, 1987

[54] SINGLE HANDLE MIXING VALVE INCORPORATING A CARTRIDGE AND A REVERSING PISTON

[75] Inventors: Alfons Knapp, Biberach an der Riss, Fed. Rep. of Germany; Roland Grassberger, Brussels, Belgium

[73] Assignee: Masco Corporation, Taylor, Mich.

[21] Appl. No.: 804,261

[22] Filed: Dec. 3, 1985

[51] Int. Cl.[4] ............................................. F16K 11/06
[52] U.S. Cl. ............................. 137/625.4; 137/625.17; 137/270
[58] Field of Search ............ 137/269, 270, 271, 625.4, 137/625.41, 625.17, 454.6, 454.5, 454.2; 4/192

[56] References Cited

U.S. PATENT DOCUMENTS 4,378,029 3/1983 Parkison ........................... 137/625.4
4,584,723 4/1986 Hussauf ....................... 137/625.41 X

*Primary Examiner*—Alan Cohan
*Assistant Examiner*—John A. Rivell
*Attorney, Agent, or Firm*—Steven L. Permut; Malcolm L. Sutherland; Leon E. Redman

[57] ABSTRACT

A mixing valve for a faucet includes a cartridge and a chamber of a body and a reversing piston within a bore positioned below the chamber. The piston has passageways therethrough in communication with the inlets of the body and also in communication with respective entrances of the cartridge. As the piston is rotated 180° from its initial position, the passageways connect the opposite inlets with the respective entrances in the cartridge. As such operation of the handle can always be conventional where movement of the handle to the right provides cold water and to the left provides hot water irrespective as to which inlets in the body provide the hot and cold water.

9 Claims, 8 Drawing Figures

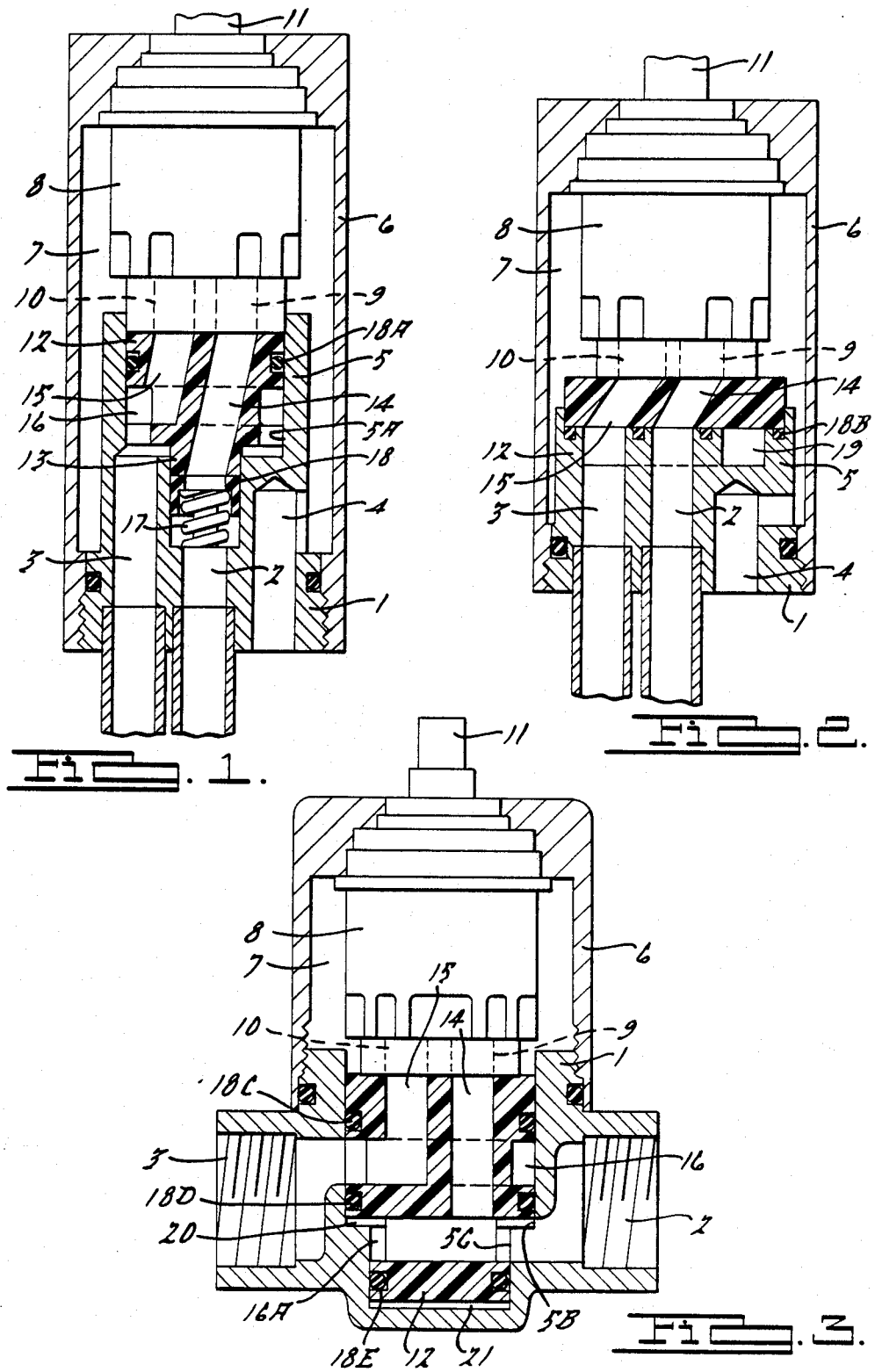

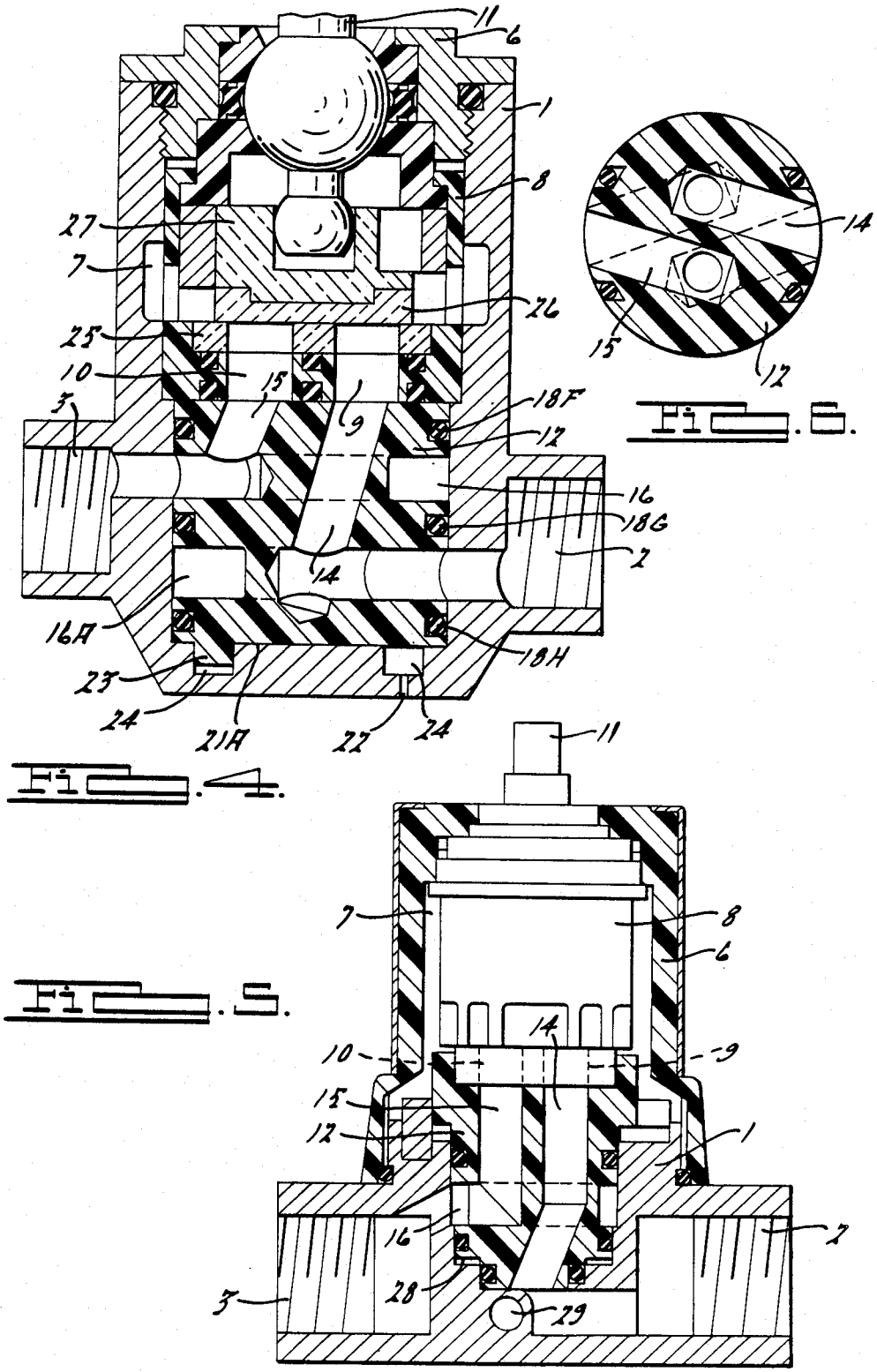

SINGLE HANDLE MIXING VALVE INCORPORATING A CARTRIDGE AND A REVERSING PISTON

TECHNICAL FIELD

This invention relates to faucet valves and more particularly single handle mixing valves incorporating a cartridge that includes ceramic plates.

BACKGROUND OF THE INVENTION

Faucet valves that incorporate a single control handle, commonly in the form of a lever, conventionally are operated such that shifting of the lever handle to the right provides for cold water delivery and a shifting to the left provides for hot water. In order to provide this, the hot water and cold water must be provided in specific first and second inlets. Reversal of the hot and cold water supply to the first and second inlets causes an undesired reversal in the operation of the faucet. Therefore, location of supply pipes within newly constructed walls is extremely important to provide for the correct orientation and operation of the faucets.

However, certain difficulties arise in specific situations. For example, it is extremely convenient to have two faucets in two different rooms placed on the opposite sides of a common wall and hooked to common supply pipes. Unfortunately the pipe that is on the right for a first faucet turns out to be on the left for the other faucet. So unless one accepts the fact that each faucet operates in an opposite fashion from the other, it is necessary to have two faucets with two different operating mechanisms therein that provide for reverse arrangement of the supply pipes. This factor provides for higher cost and the risk of installing the wrong faucet which would require later replacement.

It is desired to have a faucet that can be easily adjusted to provide for the correct conventional operation of the faucet handle regardless of the arrangement of the supply pipes, i.e. regardless whether the cold water is on the right or the left and the hot water is on the left or right, respectively. It is desired to have a commonly designed faucet that can be situated on both sides of a common wall and still provide for the operation to be conventional, i.e. movement of the lever to the right provides cold water and to the left provides hot water.

SUMMARY OF THE INVENTION

In accordance with one aspect of the invention, the faucet valve has a faucet body with a chamber therein that receives conventional valve elements. A reversing mechanism is interposed between the inlets in the body and the valve elements. The reversing mechanism is constructed that one can selectively choose between two modes; one mode fluidly communicates the first and second inlets to first and second portions of the valve element, respectively, and the second mode, vice versa.

Preferably, the reversing mechanism is a single member that can be rotated 180° to fluidly communicate the valve inlets to a valve cartridge that has two entrances. Furthermore, the reversing member is preferably a piston that has a surface area that is responsive to hydraulic pressure from one of the inlets to provide an upward compressive force onto the cartridge to maintain compressive force between two valve elements within the cartridge.

An optional spring member can be interposed between the piston and the faucet body to provide for further upward biasing force of the piston onto the cartridge.

In broader terms, the single handle mixing valve has a reversing means operably interposed between the two inlets of the body and two portions of the valve mechanism for selectively choosing between two modes of operation. The reversing mechanism could include a set of two reversing members where selection of one reversing member provides for communication of the first inlet to the first portion of the valve member and a selection of the second reversing member provides for a communication of the first inlet to the second valve portion.

By utilizing the reversing mechanism within a faucet body, the faucet can be easily connected to the supply pipes regardless of whether the cold or the hot supply pipe is on the right side. The position of the hot and cold supply pipes can be compensated by the correct selection or positioning of the reversing member within the faucet body so that the hot and cold water is delivered to the appropriate cartridge entrances or other valve portions independently of the fact that hot and cold water pass through the first or second inlets within the faucet body.

BRIEF DESCRIPTION OF THE DRAWINGS

Reference now will be made to the following drawings in which:

FIG. 1 is a segmented side elevational view of one embodiment of the invention;

FIG. 2 is a view similar to FIG. 1 showing a second embodiment of the invention;

FIG. 3 is a view similar to FIG. 1 showing a third embodiment of the invention;

FIG. 4 is a view similar to FIG. 1 showing a fourth embodiment of the invention;

FIG. 5 is a view similar to FIG. 1 showing a fifth embodiment of the invention;

FIG. 6 is a cross-sectional top plan view of an alternate embodiment of the reversing mechanism;

DETAILED DESCRIPTION OF THE PREFERRED EMBODIMENTS

Figure 7:
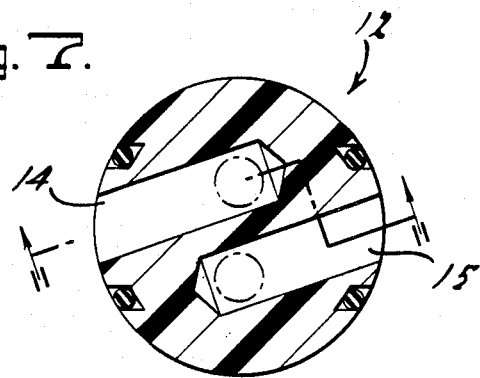
FIG. 7 is a cross sectional top plan view of another alternate embodiment of the reversing mechanism.

Referring now to FIG. 1, a single handle mixing valve includes a body 1 having two inlets 2 and 3 for hot and cold water and a discharge outlet 4 that can be connected to a spout. The body is connected to a cap member 6 which together with the body 1 defines a chamber 7. The body 1 includes a cylindrical extension 5 which has a central bore 5a. A valving cartridge 8 of conventional construction has first and second entrances 9 and 10 for the hot and cold water, respectively. A control lever 11 extends upwardly through the cap member 6 for controlling in conventional fashion the movements of the valve elements within the cartridge. Cartridge 8 is fitted within the cap chamber 7 such that the entrances 9 and 10 face downwardly into the bore 5a.

A reversing piston 12 is also fitted within the bore 5a and has a centrally protruding downward extension 13 that is sized to fit within the central inlet 2. The piston 12 has a first passageway 14 which extends from the central extension 13 to the entrance 9 for the hot water in cartridge 8. A second passage 15 connects the entrance 10 for the cold water to an annular chamber 16 which in turn is in fluid communication with the second inlet 3. The annular chamber 16 can alternatively be a peripheral groove that extends only partially about the piston member.

In the position shown, hot water is supplied through inlet 2 and cold water is supplied through inlet 3. The valve is operable in the correct manner. However, if inlet 2 provided the cold water and inlet 3 provided the hot water, the valve member would operate in an opposite and undesirable manner. However, this can be easily corrected by rotating the piston member 180° such that the passage 14 connects inlet 2 to entrance 10 and passage 15 connects entrance 9 to inlet 3.

Furthermore, a spring member 17 is received within the inlet 2 and upwardly biases the piston member 12 to press against the cartridge 8. Furthermore, hydraulic pressure within inlet 3 provides for upward hydraulic thrust onto the piston 12 which again biases the piston upwardly against the cartridge. The particular way in which the hydraulic force and spring provides for compressive force on the valve elements is described in detail in my copending application entitled "Single Handle Mixing Valve with Hydraulic Responsive Piston" filed the same day as this application. The compressive force exerted onto the cartridge helps prevent leakage between the valve elements within the cartridge. A sealing seat 18 is interposed between the spring 17 and relief section 13 to sealingly separate inlet 2 from inlet 3 and an annular seal 18a circumscribes the piston member 12 to prevent leakage thereabout.

FIG. 2 shows a second embodiment in which the inlet 3 is in communication with an annular chamber 19 that is situated within the body 5 itself rather than within the piston 12. Passage 15 is in direct communication with chamber 19 that connects to either entrance 10 or 9 depending on the rotated position of the piston. The piston 12 has a passage 14 which connects the inlet 2 to either entrance 9 or entrance 10 depending on its rotated position. Elastomeric seals 18b interposed between the body and the piston member 12 combines both functions of sealing the inlets 2 and 3 from each other and to provide for an upward spring bias onto piston 12. Again, hydraulic pressure within chamber 19 forces the piston 12 upwardly against the cartridge 8.

FIG. 3 shows a faucet body in which inlets 2 and 3 are received in the faucet body from the side rather than the bottom as shown in the first two embodiments. The body 1 includes a stepped bore with wider section 5b and narrower section 5c that receives the stepped piston 12. A stepped piston 12 has two annular grooves that form chambers 16 and 16a therein. Seals 18c and 18d prevent leakage about piston member 12. Passage 14 is in communication with the annular chamber 16a and passage 15 is in communication with chamber 16. Annular chamber 16a is in communication with inlet 2 and annular chamber 16 is in communication with inlet 3.

As with the other embodiments, fluid pressure within annular chamber 16a which extends out to the wide bore section 5b provides for a net upward thrust of the piston 12. Furthermore, within narrower bore section 5c is a chamber 21 which contains trapped compressed air which provides for an upward spring bias of the piston 12. With the position of the piston member as shown in FIG. 3, passage 14 connects to entrance 9 and passage 15 connects to entrance 10. Rotation of the piston member 12 through 180° will change the connections of the passageways so that passage 14 connects to entrance 10 and passage 15 connects to entrance 9.

Referring now to the embodiment shown in FIG. 4, the body 1 extends substantially further upward and the cap member 6 is connected to the body. In other words the chamber 7 is formed basically within the body rather than within the cap member. The cartridge 8 fits within this chamber 7. The piston member 12 is basically cylindrical in shape with two annular circumferential grooves forming chambers 16 and 16a. Passage 14 is in communication with chamber 16a and passage 15 is in communication with chamber 16. Furthermore annular seals 18f, 18g and 18h prevent leakage about the piston. Chamber 21a formed below the piston has an atmospheric relief port 22 so that the piston does not provide any hydraulic thrust onto the cartridge 8. Furthermore, the piston has a locating protrusion 23 that can fit within two opposed circumferentially spaced seats 24 within the body 1.

The cartridge members are also shown in segmented form to disclose the movable valve element 26 seated on the fixed valve element 25 and being controlled by control head 27 which is operated by the lever 11.

Figure 8:
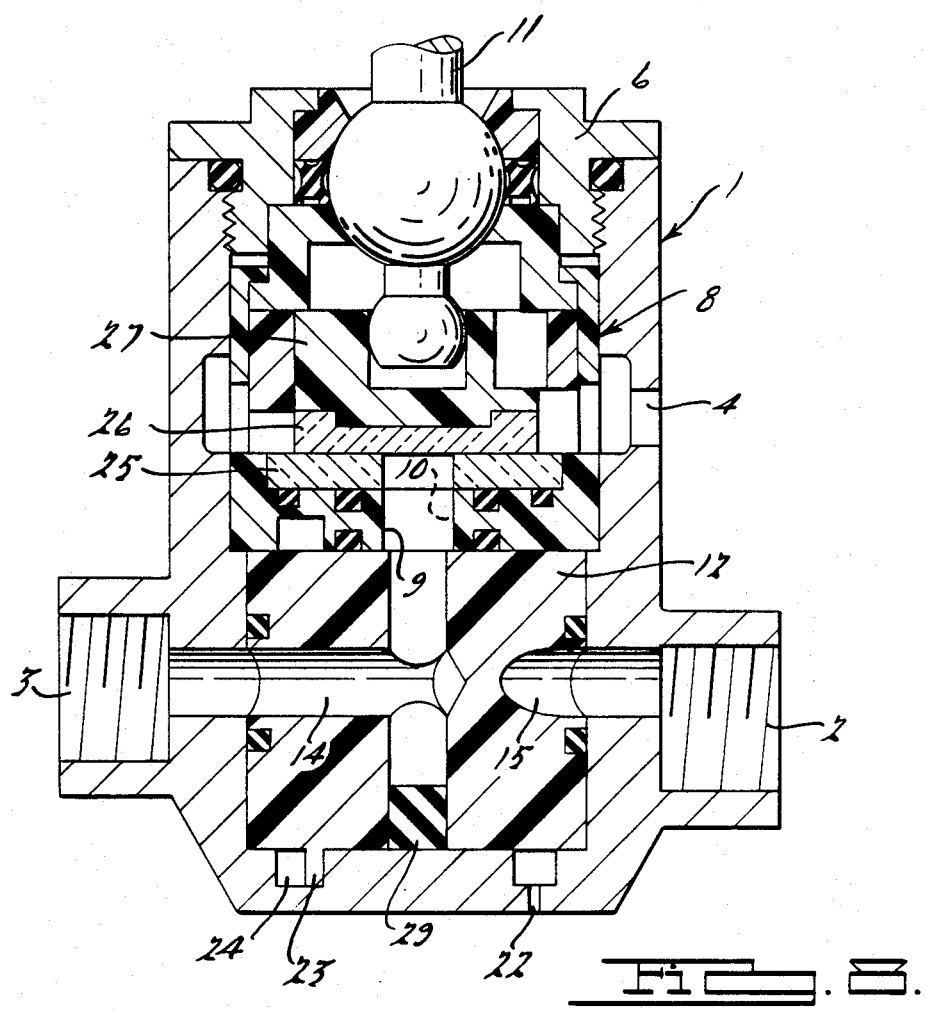
FIG. 8 is a segmented side elevational view of a faucet showing the reversing mechanism of FIG. 7 along the lines 8—8.

FIG. 7 shows a variation of a pistons to fit within the body 1 shown in FIG. 8. In this embodiment the passage members 14 and 15 are in direct communication with the inlets 2 and 3 or vice versa depending on its oriented position. This piston is cylindrical in shape with no annular chambers. The vertical extensions of passages 14 and 15 can extend to both the bottom and top ends of the piston member 12. Plugs 29 can then be inserted on either the top or bottom end depending on the oriented position of the piston 12. If reversing of the operation is desired, the piston can merely be turned upside down and the plugs 29 removed from one end and then positioned to the other end of the piston.

Alternatively, the reversing mechanism may include two separate piston members one having passages 14 and 15 shown in FIG. 6 in solid line, and the second member having alternative passages shown in phantom in FIG. 6. As such, reversal of water flow can be achieved by the selection of either one of the pistons fitted in body 1 shown in FIG. 8.

Another embodiment is disclosed in FIG. 5 in which the inlet 2 communicates with the bottom of the piston and the reversing member 12 to passage 14 and inlet 3 is in communication with the peripheral chamber 16 that in turn is in communication with passage 15. An annular chamber 28 contains entrapped compressed air and acts as a spring member biasing the piston upwardly against the cartridge 8. Furthermore, hydraulic pressure from inlet 2 acts on the bottom of the piston to again upwardly bias the piston 16. Rotation of the piston 180° again switches the connection of passages 14 and 15 from entrances 9 and 10 to entrances 10 and 9, respectively. Internal passageway 29 is connected to two spout connections on opposite sides of the body 1 at 90° rotation from the inlets 2 and 3.

The reversing member can also be connected through elastic spring or through friction to the cartridge itself to more easily be removed from the body 1 as the cartridge is pulled out from the body.

The reversing member can be removably connected to form the bottom of the cartridge. Alternatively, the piston can be fixed to form the bottom of the cartridge where the whole cartridge can be rotated to two opposite positions to correspond to the desired operation of the handle.

In operation, the reversing member is operated by selecting one of two separate pieces, rotation of the member through 180° or slipping it upside down.

In all cases, a common faucet body can be attached to supply pipes in standard fashion without encountering irreversible problems as to which inlets must be connected to the hot and cold supply pipes.

Another particular alternative is to have the reversing member incorporated into the cartridge without the cartridge being able to be rotated within the housing. In this case, a particular cartridge must be chosen in much the same fashion as a particular reversing member shown in FIG. 6.

Variations and modifications of the present invention are possible without departing from the scope and spirit as defined in the appended claims.

The embodiments of the invention in which an exclusive property or privilege is claimed are defined as follows:

1. A single handle mixing valve characterized by:
    a body with a first and second inlet for hot and cold water, respectively, and an outlet for discharging mixed water;
    a cap being fixed to the body and forming with the body a chamber for receiving a cartridge constructed to control and regulate water flow from the two inlets to the outlet;
    said cartridge having a first and second entrance for receiving the hot and cold water from the respective first and second inlets;
    a reversing means operably interposed between the two inlets of the body and two entrances of the cartridge for selectively choosing between two modes to fluidly commuincate the first inlet to the first entrance and the second inlet to the second entrance being a first mode or the first inlet to the second entrance and second inlet to the first entrance being a second mode;
    the reversing means including a member being selectively fixed within the faucet body in a choice of two different positions; each position corresponding to the respective first or second modes;
    the two different positions of said member achieved by rotating the member about a central axis; and
    the member having at least a portion of its surface which is exposed to the pressure of one inlet such that the member is biased against the cartridge.

2. A mixing valve according to claim 1 wherein said surface is annular and exposed to an annular chamber that is in pressure communication with one inlet.

3. A mixing valve according to claim 2 wherein an air chamber having compressed air is interposed between said member and said body to spring bias said member against said cartridge.

4. A mixing valve according to claim 1 wherein an annular air chamber is operably interposed between said body and said member having compressed air therein to act as a spring to bias said member against said cartridge.

5. A single handle mixing valve characterized by:
    a body with a first and second inlet for hot and cold water, respectively, and an outlet for discharging mixed water;
    a cap being fixed to the body and forming with the body a chamber for receiving a cartridge constructed to control and regulate water flow from the two inlets to the outlet;
    said cartridge having a first and second entrance for receiving the hot and cold water from the respective first and second inlets;
    a reversing means operably interposed between the two inlets of the body and two entrances of the cartridge for selectively choosing between two modes to fluidly commuincate the first inlet to the first entrance and the second inlet to the second entrance being a first mode or the first inlet to the second entrance and second inlet to the first entrance being a second mode;
    the reversing means including a member being selectively fixed within the faucet body in a choice of two different positions; each position corresponding to the respective first or second modes;
    the two different positions of said member achieved by rotating the member about a central axis; and
    said member having a passage therethrough in direct communication with the first inlet of the body, and a second passage in communication with an annular chamber which in turn is in communication with the second inlet of the body.

6. A mixing valve according to claim 5 wherein said annular chamber is formed in the reversing member.

7. A mixing valve according to claim 5 wherein said annular chamber is formed in the faucet body.

8. A single handle mixing valve characterized by:
    a body with a first and second inlet for hot and cold water, respectively, and an outlet for discharging mixed water;
    a cap being fixed to the body and forming with the body a chamber for receiving a cartridge constructed to control and regulate water flow from the two inlets to the outlet;
    said cartridge having a first and second entrance for receiving the hot and cold water from the respective first and second inlets;
    a reversing means operably interposed between the two inlets of the body and two entrances of the cartridge for selectively choosing between two modes to fluidly communicate the first inlet to the first entrance and the second inlet to the second entrance being a first mode or the first inlet to the second entrance and second inlet to the first entrance being a second mode;
    the reversing means including a member being selectively fixed within the faucet body in a choice of two different positions; each position corresponding to the respective first or second modes; and
    the member having at least a portion of its surface which is exposed to the pressure of one inlet such that the member is biased against the cartridge.

9. A single handle mixing valve characterized by:
    a body with a first and second inlet for hot and cold water, respectively, and an outlet for discharging mixed water;
    a cap being fixed to the body and forming with the body a chamber for receiving a cartridge constructed to control and regulate water flow from the two inlets to the outlet;
    said cartridge having a first and second entrance for receiving the hot and cold water from the respective first and second inlets;
    a reversing means operably interposed between the two inlets of the body and two entrances of the cartridge for selectively choosing between two modes to fluidly communicate the first inlet to the first entrance and the second inlet to the second entrance being a first mode or the first inlet to the second entrance and second inlet to the first entrance being a second mode;

the reversing means including a member being selectively fixed within the faucet body in a choice of two different positions; each position corresponding to the respective first or second modes; and said member having a passage therethrough in direct communication with the first inlet of the body and a second passage in communication with an annular chamber which in turn is in communication with the second inlet of the body.

* * * * *